United States Patent
Sano et al.

(10) Patent No.: US 8,993,171 B2
(45) Date of Patent: Mar. 31, 2015

(54) ACTIVE MATERIAL, ELECTRODE CONTAINING THE ACTIVE MATERIAL, LITHIUM SECONDARY BATTERY INCLUDING THE ELECTRODE, AND METHOD FOR MAKING ACTIVE MATERIAL

(75) Inventors: Atsushi Sano, Tokyo (JP); Keitaro Otsuki, Tokyo (JP); Kouji Tokita, Tokyo (JP); Tomohiko Kato, Tokyo (JP); Akiji Higuchi, Kyoto (JP)

(73) Assignee: TDK Corporation, Tokyo (JP)

( * ) Notice: Subject to any disclaimer, the term of this patent is extended or adjusted under 35 U.S.C. 154(b) by 207 days.

(21) Appl. No.: 13/810,464

(22) PCT Filed: Jul. 12, 2011

(86) PCT No.: PCT/JP2011/065832
§ 371 (c)(1),
(2), (4) Date: Feb. 4, 2013

(87) PCT Pub. No.: WO2012/008423
PCT Pub. Date: Jan. 19, 2012

(65) Prior Publication Data
US 2013/0130106 A1   May 23, 2013

(30) Foreign Application Priority Data
Jul. 16, 2010   (JP) .................. 2010-162085

(51) Int. Cl.
 H01M 4/58   (2010.01)
 H01M 4/131   (2010.01)
 C01B 25/45   (2006.01)
 H01M 4/04   (2006.01)
 H01M 10/052   (2010.01)

(52) U.S. Cl.
 CPC .............. H01M 4/131 (2013.01); C01B 25/45 (2013.01); H01M 4/5825 (2013.01); H01M 10/052 (2013.01); H01M 4/0471 (2013.01)
 USPC .................................... 429/231.9; 429/231.5

(58) Field of Classification Search
 CPC . H01M 4/5825; H01M 4/131; H01M 4/0471; H01M 4/04; H01M 10/052; C01B 25/45
 See application file for complete search history.

(56) References Cited

U.S. PATENT DOCUMENTS

2009/0087660 A1* 4/2009 Suzuki et al. ................. 428/403
2010/0078591 A1   4/2010 Sano et al.

FOREIGN PATENT DOCUMENTS

| CN | 101714623 A | 5/2010 | |
| JP | A-2003-68304 | 3/2003 | |
| JP | 2004-303527 | * 10/2004 | ............. H01M 4/58 |
| JP | A-2004-303527 | 10/2004 | |

OTHER PUBLICATIONS

Ren, M.M. et al. "LiVOP$_4$: A Cathode Material for 4V Lithium Ion Batteries," Journal of Power Sources, vol. 189, pp. 786-789, 2009.
Lii et al., "Hydrothermal Synthesis, Structure, and Magnetic Properties of a New Polymorph of Lithium Vanadyl(IV) Orthophosphate: β-LiVOPO$_4$," Journal of Solid State Chemistry, 1991, vol. 95, pp. 352-359.
Dupre et al., "Positive Electrode Materials for Lithium Batteries Based on VOPO$_4$," Solid State Ionics, 2001, vol. 140, pp. 209-221.
Dupre et al., "Electrochemical Performance of Different Li-VOPO$_4$ Systems," Journal of Power Sources, 2001, vol. 97-98, pp. 532-534.
Barker et al., "Electrochemical Properties of Beta-LiVOPO$_4$ Prepared by Carbothermal Reduction," Journal of the Electrochemical Society, 2004, vol. 151, No. 6, pp. A796-A800.

* cited by examiner

Primary Examiner — Raymond Alejandro
(74) Attorney, Agent, or Firm — Oliff PLC

(57) ABSTRACT

To provide an active material from which a sufficient discharge capacity is obtained, an electrode containing the active material, a lithium secondary battery including the electrode, and a method for making an active material. A method for making an active material includes a temperature elevation step of heating a mixture containing a lithium source, a pentavalent vanadium source, a phosphoric acid source, water, and a reductant in a hermetically sealed container at a temperature elevation rate T1 from 25° C. to 110° C. and then at a temperature elevation rate T2 from 110° C. to a designated temperature of 200° C. or more, in which T1>T2; T1=0.5 to 10° C./min; and T2=0.1 to 2.2° C./min.

3 Claims, 3 Drawing Sheets

ACTIVE MATERIAL, ELECTRODE CONTAINING THE ACTIVE MATERIAL, LITHIUM SECONDARY BATTERY INCLUDING THE ELECTRODE, AND METHOD FOR MAKING ACTIVE MATERIAL

TECHNICAL FIELD

The present invention relates to an active material, an electrode containing the active material, a lithium secondary battery including the electrode, and a method for making an active material.

BACKGROUND ART $LiVOPO_4$ is known as a compound that can realize a 4-V-class charge-discharge voltage among phosphate-based positive electrode materials. However, lithium ion secondary batteries that use $LiVOPO_4$ have not achieved sufficient reversible capacities or rate characteristics. This positive electrode material is, for example, disclosed in PTL 1, PTL 2, and NPL 1 to NPL 4 below. Crystals represented by structural formula $LiVOPO_4$ are known to undergo reversible lithium ion intercalation and de-intercalation. According to PTL 1, the discharge capacity of a nonaqueous electrolyte secondary battery is larger when β-type crystals of $LiVOPO_4$ are employed than when α-type crystals (triclinic crystals) of $LiVOPO_4$ are employed.

CITATION LIST

Patent Literature

PTL 1: Japanese Unexamined Patent Application Publication No. 2004-303527
PTL 2: Japanese Unexamined Patent Application Publication No. 2003-68304

Non Patent Literature

NPL 1: J. Solid State Chem., 95, 352 (1991)
NPL 2: J. N. Dupre et al., Solid State Ionics, 140 pp. 209-221 (2001)
NPL 3: N. Dupre et al., J. Power Sources, 97-98, pp. 532-534 (2001)1
NPL 4: J. Baker et al., J. Electrochem. Soc., 151, A796 (2004)

SUMMARY OF INVENTION

Technical Problem

However, active materials containing β-type crystals of $LiVOPO_4$ obtained by conventional methods do not have sufficient discharge capacities.

An object of the present invention is to provide an active material from which sufficient discharge capacities are obtained, an electrode containing the active material, a lithium secondary battery including the electrode, and a method for making the active material.

Solution to Problem

The inventors of the present invention have conducted extensive research to achieve the above-described object and found that an active material containing a mixture of fine particles having two types of β-type crystal structures of different shapes is obtained by controlling the temperature elevation rate to be high at first and then low and that the discharge capacity of this active material is sufficiently high.

A method for making an active material according to the present invention includes a temperature elevation step of heating a mixture containing a lithium source, a pentavalent vanadium source, a phosphoric acid source, water, and a reductant in a hermetically sealed container at a temperature elevation rate T1 from 25° C. to 110° C. and then at a temperature elevation rate T2 from 110° C. to a designated temperature of 200° C. or more. In this method, T1>T2; T1=0.5 to 10° C./min; and T2=0.1 to 2.2° C./min.

An active material according to the present invention includes β-type $LiVOPO_4$ particles that have an aspect ratio of 1 to 0.7 and an average particle diameter of 0.4 to 1 μm and β-type $LiVOPO_4$ particles that have an aspect ratio of 0.3 or less and an average long-axis length of 0.2 to 0.9 μm. Such an active material is obtained by the method for making an active material described above and offers a high discharge capacity.

An electrode according to the present invention includes a collector and an active material layer that contains the active material described above and that is disposed on the collector.

An active material according to the present invention is a lithium secondary battery including the electrode described above.

The method for making an active material according to the present invention preferably further includes a step of firing β-type crystals of $LiVOPO_4$ obtained in the aforementioned step.

Advantageous Effects of Invention

According to the present invention, an active material that offers a sufficient discharge capacity, an electrode containing the active material, a lithium secondary battery including the electrode, and a method for making an active material can be provided.

DESCRIPTION OF EMBODIMENTS

Figure 1:
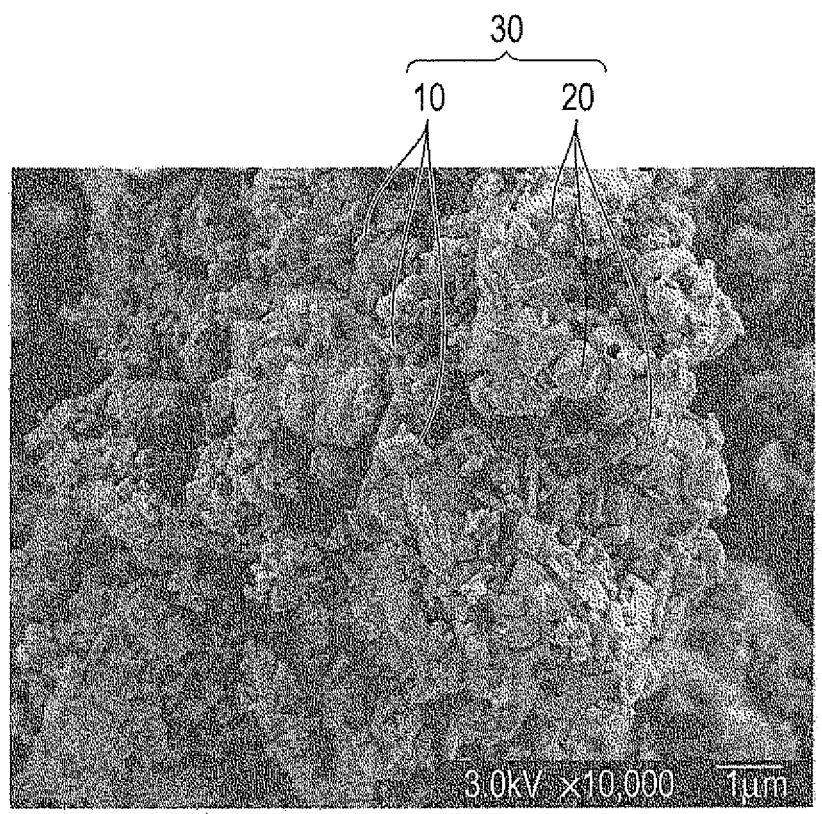
FIG. 1 is an electron microscope image of an active material obtained in Example 1.

Preferred embodiments of the present invention will now be described with reference to drawings. In the description below, the same or corresponding components are represented by the same reference symbols and the descriptions thereof are omitted to avoid redundancy. The scale ratio is not limited to that illustrated in the drawings.

<Active Material>

First, an active material according to an embodiment is described. FIG. 1 is a scanning electron microscopy (SEM) image showing one example of an active material according to an embodiment. An active material 30 of this embodiment is a mixture of rodlike particles 10 and spherical particles 20 and these particles are usually mixed and aggregated. The rodlike particles 10 are particles having an aspect ratio of 0.3 or less and an average long-axis length of 0.2 to 0.9 μm, and are mainly composed of β-type crystals of $LiVOPO_4$. The spherical particles 20 have an aspect ratio of 1 to 0.7 and an average particle diameter of 0.4 to 1 μm, and are mainly composed of β-type crystals of $LiVOPO_4$.

The aspect ratio of a particle is determined by dividing the short-side length by the long-side length of a minimum-area circumscribed rectangle enclosing the particle in a SEM image. The mixing ratio of the rodlike particles 10 to the spherical particles 20 is not particularly limited but may be 10:1 to 1:10 on a number basis.

In this embodiment, the average diameter of a spherical particle is represented by the maximum distance in a designated A direction in a SEM image, i.e., the distance between parallel lines orthogonal to the A direction and circumscribing the particle (a.k.a., Feret diameter). The average long-axis length of the rodlike particles can be easily measured as the long-side length of the above-described rectangle in the SEM image. The average may be determined from about 100 particles.

Here, the phrase "mainly composed of β-type crystals of $LiVOPO_4$" means that the β-type crystals of $LiVOPO_4$ accounts for about 80 mass % or more of the total of the β-type crystals of $LiVOPO_4$ and α-type crystals of $LiVOPO_4$. The amounts of the β-type crystals of $LiVOPO_4$ and the α-type crystals of $LiVOPO_4$, and other components, in the active material can be measured by, for example, X-ray diffractometry. Usually, a peak attributable to the β-type crystals of $LiVOPO_4$ is found at $2\theta=27.0°$ and a peak attributable to the α-type crystals of $LiVOPO_4$ is found at $2\theta=27.2°$. An active material 1 may contain trace amounts of unreacted raw material components and the like in addition to the β-type crystals of $LiVOPO_4$ and the α-type crystals of $LiVOPO_4$.

<Method for Making Active Material>

A method for making an active material according to an embodiment will now be described. The method for making an active material according to the present invention has the following temperature elevation step.

[Temperature Elevation Step]

The temperature elevation step is a step of heating a mixture of a lithium source, a pentavalent vanadium source, a phosphoric acid source, water, and a reductant in an hermetically sealed container. Because a hermetically sealed container is used, the pressure inside the container increases as heating is conducted.

(Mixture)

Examples of the lithium source include lithium compounds such as $LiNO_3$, $Li_2CO_3$, $LiOH$, $LiCl$, $Li_2SO_4$, and $CH_3COOLi$. Of these, $LiNO_3$ and $Li_2CO_3$ are preferable.

Examples of the pentavalent vanadium source include vanadium compounds such as $V_2O_5$ and $NH_4VO_3$.

Examples of the phosphoric acid source include $PO_4$-containing compounds such as $H_3PO_4$, $NH_4H_2PO_4$, $(NH_4)_2HPO_4$, and $Li_3PO_4$. Of these, $H_3PO_4$ and $(NH_4)_2HPO_4$ are preferable.

The lithium source concentration is not particularly limited but the lithium source is preferably added so that the ratio of the number of moles of lithium atoms to the number of moles of pentavalent vanadium atoms is 0.95 to 1.2. The phosphoric acid source concentration is also not particularly limited but the phosphoric acid source is preferably added so that the ratio of the number of moles of phosphorus atoms to the number of moles of the pentavalent vanadium atoms is 0.95 to 1.2. If, with regard to the lithium atoms and phosphorus atoms, at least one of the above ratios is less than 0.95, the discharge capacity of the resulting active material tends to be low and the rate characteristic tends to be low. If, with regard to the lithium atoms and phosphorus atoms, at least one of the above ratios is more than 1.2, the discharge capacity of the resulting active material tends to be low.

The reductant is not particularly limited and examples thereof include organic acids such as citric acid, ascorbic acid, and tartaric acid, hydrazine, and hydrogen peroxide. The amount of the reductant is not particularly limited but the reductant content is preferably 0.1 to 1 mol/L with respect to the total amount of the mixture. The ratio of the number of moles of the reductant to the number of moles of the pentavalent vanadium atoms is preferably 10 to 100 mol %.

In making an active material-containing layer of an electrode by using the resulting active material, a conductive material such as a carbon material is frequently brought into contact with the surface of the active material to increase the electrical conductivity. To do this, the active material and a conductive material may be mixed after the production of the active material so as to form an active layer or, for example, a carbon material serving as a conductive material may be added to the mixture, which is the raw material for hydrothermal synthesis, to cause carbon to attach to the active material.

Examples of the conductive material used as a carbon material to be added to the mixture include activated carbon, graphite, soft carbon, and hard carbon. Among these, activated carbon is preferably used since carbon particles can be easily dispersed in the mixture during hydrothermal synthesis. However, it is not necessary to add all of the conductive material to the mixture during hydrothermal synthesis. Preferably, at least part of the conductive material is added to the mixture during hydrothermal synthesis. As a result, the amount of a binder used for forming the active-material-containing layer can be reduced and the capacity density can be increased in some cases.

The content of the conductive material such as carbon particles in the mixture in the hydrothermal synthesis step is preferably adjusted so that the ratio C/M of the number of moles C of the carbon atoms constituting the carbon particles to the number of moles M of the vanadium atoms contained in the pentavalent vanadium compound, for example, satisfies $0.04 \leq C/M \leq 4$. If the conductive material content (number of moles C) is excessively low, the electrical conductivity and the capacity density of the electrode active material constituted by the active material and the conductive material tend to be low. If the conductive material content is excessively high, the weight of the active material in the electrode active material is relatively decreased and the capacity density of the electrode active material tends to be low. When the conductive material content is within the aforementioned range, these tendencies can be suppressed.

The amount of water in the mixture is not particularly limited as long as hydrothermal synthesis is possible. The ratio of the substances other than water in the mixture is preferably 35 wt % or less.

The order in which the raw materials are fed when preparing the mixture is not particularly limited. For example, the raw materials of the mixture may be mixed all at once or the pentavalent vanadium compound may be added to a mixture of water and a $PO_4$-containing compound, followed by addition of the reductant and then the lithium compound. Preferably, the mixture is thoroughly mixed to sufficiently disperse the added components. At least part of the lithium compound, the pentavalent vanadium compound, and a $PO_4$-containing compound preferably remains undissolved in water and the mixture is preferably a suspension.

In the temperature elevation step, the mixture (lithium compound, pentavalent vanadium compound, $PO_4$-containing compound, water, reductant, etc.) is fed into a reactor (e.g., an autoclave) capable of heating and pressurizing the interior by heating a water-containing mixture in the hermetically sealed container. The mixture may be prepared in the reactor.

The reactor is sealed and the mixture is heated from 25° C. to 110° C. at a temperature elevation rate T1. Then the temperature is elevated from 110° C. to a designated end temperature of 200° C. or more at a temperature elevation rate T2. T1=0.5 to 10° C./min and preferably T1=3 to 5° C./min. Since a hydrothermal synthesis reaction rarely occurs at a temperature of 25° C. or less, the temperature elevation rate is not particularly limited at 25° C. or less.

Here, T1>T2. Preferably, T1−T2≥1° C./min, more preferably T1−T2≥2° C./min, and most preferably T1−T2≥3° C./min. T2=0.1 to 2.2° C./min and preferably T2=0.1 to 0.5° C./min. The temperature elevation rate may fluctuate. In such a case, the temperature elevation rate T is the time-average value in each temperature zone. In such a case, the maximum value and the minimum value of the temperature in each temperature zone are preferably within the temperature ranges described above. As the temperature inside the reactor rises, the pressure in the reactor increases due to the vapor pressure of water.

The designated end temperature is not particularly limited but is preferably 200° C. to 300° C. In order to improve the discharge capacity of the resulting active material, the designated end temperature is more preferably 220° C. to 280° C. When the designated end temperature is excessively low, the crystallinity of the resulting β-type crystals of LiVOPO$_4$ is lowered and the capacity density of the active material tends to be low. When the designated end temperature is excessively high, high heat resistance is required for the reactor and the production cost for the active material tends to rise. Controlling the temperature of the mixture within the ranges described above can suppress these tendencies.

In this case, the pressure inside the reactor is preferably 0.1 to 30 MPa. When the pressure applied to the mixture is excessively low, the crystallinity of the resulting β-type crystals of LiVOPO$_4$ is lowered and the capacity density of the active material tends to be low. When the pressure applied to the mixture is excessively high, high pressure resistance is required for the reactor and the production cost for the active material tends to rise. Controlling the pressure applied to the mixture within the ranges described above can suppress these tendencies.

Presumably, by conducting such a temperature elevation step, the hydrothermal reaction of the mixture proceeds and the active material described above is formed.

(Retention Step)

Subsequently, if needed, a step of retaining the designated end temperature is preferably performed. Although the retention time is not particularly limited, the retention time is preferably 1 to 30 hours. Retention has an effect of promoting crystal growth.

(Cooling Step)

The reaction product is then cooled. The cooling rate is not particularly limited. Heating may be simply stopped and the mixture may be simply cooled to room temperature.

Usually, the resulting active material forms a solid in the liquid after the hydrothermal synthesis and settles. The liquid after hydrothermal synthesis is, for example, filtered to collect the solid. The collected solid is washed with water, acetone, or the like, and dried. As a result, an active material that is mainly composed of the β-type crystals of LiVOPO$_4$ described above and that contains both spherical particles and rodlike particles can be efficiently obtained.

[Firing Step]

The method for making an active material according to this embodiment may further include a step of heating the active material obtained by hydrothermal synthesis (hereinafter this step may be referred to as "firing step"). It is considered that, in this step, impurities and the like remaining in the active material obtained through the hydrothermal synthetic step are removed.

In the firing step, the active material is heated to 400° C. to 600° C. If the heating temperature is excessively high, grain growth of the active material proceeds and the particle diameter (primary particle diameter) increases. As a result, diffusion of lithium in the active material delayed and the capacity density of the active material tends to be low. In contrast, when the heating temperature is excessively low, the effect of firing is not obtained. When the heating temperature is within the above-described range, these tendencies can be suppressed. The heating time is not particularly limited but is preferably 3 to 8 hours.

The atmosphere of the firing step is not particularly limited but is preferably an ambient atmosphere in order to facilitate removal of the reductant. The firing step may be performed in an inert atmosphere such as argon gas or nitrogen gas.

According to the method for making an active material according to this embodiment, an active material which is a mixture of rodlike particles and spherical particles mainly containing the aforementioned β-type crystals of LiVOPO$_4$ can be obtained. An electrode that uses such an active material and a lithium secondary battery that uses such an electrode can achieve large discharge capacities. Such a finding has not been known and such an effect is a distinctive effect compared to the related art. Although the cause of such a result is not exactly clear, a possible cause may be that particles with high crystallinity and small diameters can be obtained by specifying the hydrothermal synthesis conditions.

<Electrode and Lithium Secondary Battery Using the Electrode>

Figure 2:
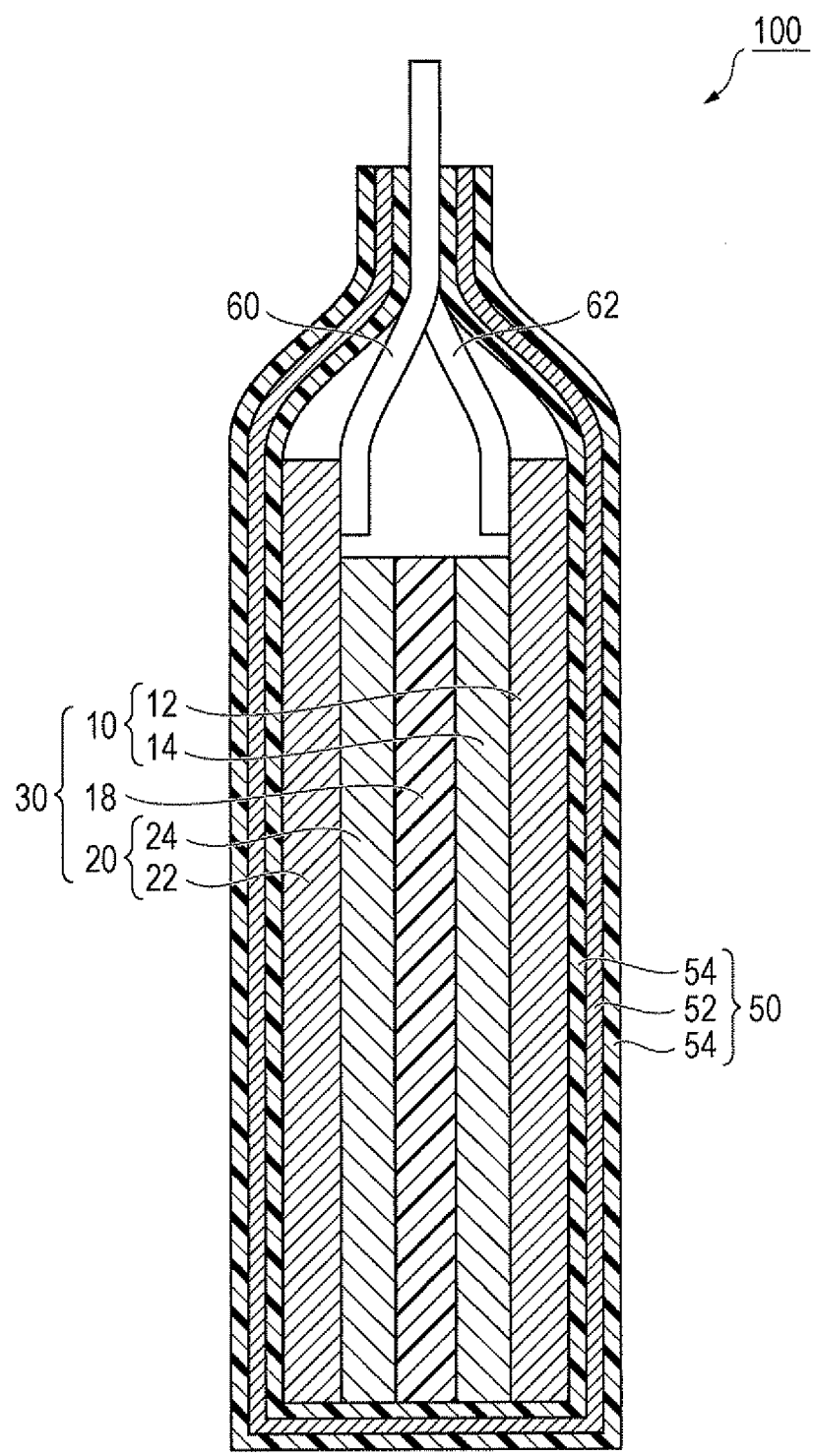
FIG. 2 is a schematic cross-sectional view of a lithium ion secondary battery according to an embodiment.

Next, an electrode that uses the active material according to the embodiment and a lithium ion secondary battery using the electrode are described. The electrode according to the embodiment is an electrode that includes a collector and an active material layer that contains the active material and is disposed on the collector. FIG. 2 is a schematic cross-sectional view of a lithium ion secondary battery 100 according to the embodiment that uses the electrode.

The lithium ion secondary battery 100 mainly includes a multilayered unit 30, a case 50 that hermetically seals and accommodates the multilayered unit 30, and a pair of leads 60 and 62 connected to the multilayered unit 30.

In the multilayered unit 30, a positive electrode 10 and a negative electrode 20 are arranged to oppose each other with a separator 18 therebetween. The positive electrode 10 includes a positive electrode collector 12 having a plate shape (film shape) and a positive electrode active material layer 14 disposed on the positive electrode collector 12. The negative electrode 20 includes a negative electrode collector 22 having a plate shape (film shape) and a negative electrode active material layer 24 disposed on the negative electrode collector 22. The positive electrode active material layer 14 and the negative electrode active material layer 24 respectively contact the two sides of the separator 18. The leads 60 and 62 are respectively connected to ends of the positive electrode collector 12 and the negative electrode collector 22 and extend to outside the case 50.

Hereinafter, the positive electrode 10 and the negative electrode 20 are generally referred to as electrodes 10 and 20, the positive electrode collector 12 and the negative electrode collector 22 are generally referred to as collectors 12 and 22, and the positive electrode active material layer 14 and the negative electrode active material layer 24 are generally referred to as active material layers 14 and 24.

First, the electrodes 10 and 20 are described in specific details.

(Positive Electrode 10)

The positive electrode collector 12 may be any electrically conductive sheet-shaped material. For example, metal thin sheets such as aluminum, copper, and nickel foils can be used.

The positive electrode active material layer 14 contains the active material according to the embodiment, a binder, and a conductive material in an amount needed.

The binder binds the active material together and binds the active material to the positive electrode collector 12.

The material of the binder may be any material capable of forming bonds described above. Examples of the material include fluororesins such as polyvinylidene fluoride (PVDF), polytetrafluoroethylene (PTFE), tetrafluoroethylene-hexafluoropropylene copolymers (FEP), tetrafluoroethylene-perfluoroalkylvinylether copolymers (PFA), ethylene-tetrafluoroethylene copolymers (ETFE), polychlorotrifluoroethylene (PCTFE), ethylene-chlorotrifluoroethylene copolymers (ECTFE), and polyvinyl fluoride (PVF).

Other examples of the binder that can be used include vinylidene fluoride-based fluororubbers such as vinylidene fluoride-hexafluoropropylene-based fluororubbers (VDF-HFP-based fluororubbers), vinylidene fluoride-hexafluoropropylene-tetrafluoroethylene-based fluororubbers (VDF-HFP-TFE-based fluororubbers), vinylidene fluoride-pentafluoropropylene-based fluororubbers (VDF-PFP-based fluororubbers), vinylidene fluoride-pentafluoropropylene-tetrafluoroethylene-based fluororubbers (VDF-PFP-TFE-based fluororubbers), vinylidene fluoride-perfluoromethylvinylether-tetrafluoroethylene-based fluororubbers (VDF-PFMVE-TFE-based fluororubbers), and vinylidene fluoride-chlorotrifluoroethylene-based fluororubbers (VDF-CTFE-based fluororubbers).

Still other examples of the binder that can be used include polyethylene, polypropylene, polyethylene terephthalate, aromatic polyamides, cellulose, styrene-butadiene rubber, isoprene rubber, butadiene rubber, and ethylene-propylene rubber. Thermoplastic elastomeric polymers such as styrene-butadiene-styrene block copolymers and hydrogenated products thereof, styrene-ethylene-butadiene-styrene copolymers, and styrene-isoprene-styrene block copolymers and hydrogenated products thereof may also be used. Syndiotactic 1,2-polybutadiene, ethylene-vinyl acetate copolymers, propylene-α-olefin (C2-C12) copolymers, and the like may also be used.

Electron-conductive polymers and ion-conductive polymers may also be used as the binder. Examples of the electron-conductive polymers include polyacetylene. In such a case, since the binder also serves as a conductive material, there is no need to add conductive materials.

Polymers having ion conductivity such as conductivity for lithium ions may be used as the ion-conductive polymer. Examples thereof include composite materials formed by complexing monomers of polymer compounds (polyether polymer compounds such as polyethylene oxide and polypropylene oxide, cross-linked polymers of polyether compounds, polyepichlorohydrin, polyphosphazene, polysiloxane, polyvinyl pyrrolidone, polyvinylidene carbonate, and polyacrylonitrile) with lithium salts or alkali metal salts mainly containing lithium such as $LiClO_4$, $LiBF_4$, $LiPF_6$, $LiAsF_6$, LiCl, LiBr, $Li(CF_3SO_2)_2N$, and $LiN(C_2F_5SO_2)_2$.

Examples of the polymerization initiator used for complexing include photopolymerization initiators and heat polymerization initiators that are suitable for the monomers described above.

The binder content in the positive electrode active material layer 14 is preferably 0.5 to 6 mass % with respect to the mass of the active material layer. When the binder content is less than 0.5 mass %, there is a tendency for the amount of the binder to be insufficient to form a strong active material layer. When the binder content exceeds 6 mass %, there is a tendency for the amount of the binder not contributing to the electrical capacity to increase and a sufficiently high volume energy density is difficult to achieve. In this case, if the electron conductivity of the binder is low, the electrical resistance of the active material layer tends to increase, thereby failing to yield a sufficient electrical capacity.

Examples of the conductive material include metal fine particles and mixtures of carbon materials and metal fine particles such as carbon blacks, carbon materials, copper, nickel, stainless steel, and iron, and conductive oxides such as ITO.

(Negative Electrode 20)

The negative electrode collector 22 may be any electrically conductive sheet-shaped material. For example, metal thin sheets such as aluminum, copper, and nickel foils can be used. The negative electrode active material is not particularly limited and a known negative electrode material for batteries can be used. Examples of the negative electrode active material include graphite, non-graphitizable carbon, graphitizable carbon, and low-temperature-firable carbon that can occlude and release (intercalate and deintercalate or dope and dedope) lithium ions; metals, such as Al, Si, and Sn, that can be compounded with lithium; amorphous compounds mainly composed of oxides such as $SiO_2$ and $SnO_2$; and particles containing lithium titanate ($Li_4Ti_5O_{12}$).

The binder and conductive material may be the same as those used for the positive electrode.

Next, the method for making the electrodes 10 and 20 according to this embodiment is described.

(Method for Making Electrodes 10 and 20)

The method for making the electrodes 10 and 20 according to this embodiment includes a step of applying coating materials, which are raw materials for the electrode active material layers 14 and 24, to collectors (hereinafter this step may be referred to as "coating step"), and a step of removing solvents in the coating materials applied to the collectors (hereinafter this step may be referred to as "solvent removal step").

(Coating Step)

The coating step of applying the coating materials to the collectors 12 and 22 will now be described. The coating materials each contain the active material, a binder, and a solvent. The coating material may contain, in addition to these components, a conductive material for increasing the electrical conductivity of the active material, for example. As the solvent, for example, N-methyl-2-pyrrolidone, N,N-dimethylformamide, or the like can be used.

The method for mixing the active material, the binder, the solvent, the conductive material, etc., constituting the coating material is not particularly limited and the order in which these materials are mixed is also not particularly limited. For example, the active material, the conductive material, and the binder may be mixed first and N-methyl-2-pyrrolidone may be added to the resulting mixture to prepare a coating material.

The coating materials are applied to the collectors 12 and 22. The method of application is not particularly limited and a method usually employed in making electrodes can be used. Examples of the method include a slit die coating method and a doctor blade method.

(Solvent Removal Step)

Then the solvents in the coating materials applied to the collectors 12 and 22 are removed. The removing method is not particularly limited. The collectors 12 and 22 to which the coating materials are applied may be dried in an atmosphere at 80° C. to 150° C., for example.

Electrodes having active material layers 14 and 24 formed as such may be pressed by using a roll pressing machine or the like, if needed. The linear pressure of the roll press may be, for example, 10 to 50 kgf/cm.

The electrodes according to this embodiment can be prepared through the aforementioned steps.

Since the electrode according to this embodiment uses the active material of the embodiment as the positive electrode active material, an electrode that has a sufficient discharge capacity can be obtained.

Other structural elements of the lithium ion secondary battery 100 that uses the electrodes prepared as mentioned above will now be described.

The electrolyte is to be contained in the positive electrode active material layer 14, the negative electrode active material layer 24, and the separator 18. The electrolyte is not particularly limited. For example, in this embodiment, an electrolyte solution containing a lithium salt (aqueous electrolyte solution or electrolyte solution using an organic solvent) can be used. However, since an aqueous electrolyte solution electrochemically has a low decomposition voltage, the withstand voltage during charging is limited to a low level. Thus, an electrolyte solution (nonaqueous electrolyte solution) that uses an organic solvent is preferable. A solution of a lithium salt in a nonaqueous solvent (organic solvent) is preferably used as the electrolyte solution. Examples of the lithium salt include $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. These salts may be used alone or in a combination of two or more.

Preferable examples of the organic solvent include propylene carbonate, ethylene carbonate, and diethyl carbonate. These may be used alone or as a mixture of two or more at a desired mixing ratio.

Note that, in this embodiment, the electrolyte may be a liquid electrolyte or a gel electrolyte obtained by adding a gelling agent. Moreover, a solid electrolyte (solid polymer electrolyte or electrolyte composed of ion-conductive inorganic material) may be used instead of the electrolyte solution.

The separator 18 is an electrically isolating porous element. Examples of the separator include a single-layer element formed of a polyethylene, polypropylene, or polyolefin film, a multilayered element including these films, a stretched film formed of a mixture of the above-described resins, and a fibrous nonwoven cloth composed of at least one material selected from the group consisting of cellulose, polyester, and polypropylene.

The case 50 hermetically seals the multilayered unit 30 and the electrolyte solution in the interior thereof. The case 50 may be any article that can prevent leakage of the electrolyte to the outside and penetration of moisture and the like from the outside into the interior of the electrochemical device 100. For example, a metal laminate film formed by coating both sides of a metal foil 52 with polymer films 54 can be used as the case 50, as shown in FIG. 2. For example, an aluminum foil can be used as the metal foil 52 and polypropylene films and the like can be used as the polymer films 54. The material for the polymer films 54 on the outer side is preferably a polymer having a high melting point, such as polyethylene terephthalate (PET) or polyamide. The material for the polymer films 54 on the inner side is preferably polyethylene (PE), polypropylene (PP) or the like.

The leads 60 and 62 are composed of a conductive material such as aluminum.

The leads 60 and 62 are respectively welded to the positive electrode collector 12 and the negative electrode collector 22 by a known method. The separator 18 sandwiched between the positive electrode active material layer 14 of the positive electrode 10 and the negative electrode active material layer 24 of the negative electrode 20 is inserted into the case 50 together with the electrolyte solution, and then the inlet of the case 50 is sealed.

While preferred embodiments of the active material, the electrode using the active material, the lithium ion secondary battery including the electrode, and the production methods therefor of the present invention have been described in detail above, the present invention is not limited to these embodiments.

For example, an electrode that uses the active material of the present invention can also be used in an electrochemical element other than lithium ion secondary batteries. Examples of the electrochemical element include secondary batteries other than lithium ion secondary batteries, such as metallic lithium secondary batteries (the active material of the present invention is used in a cathode and metallic lithium is used in an anode), and electrochemical capacitors such as lithium capacitors. These electrochemical elements can be used in power supplies of self-propelled micromachines and IC cards and distributed power supplies installed in print circuits, etc.

EXAMPLES

The present invention will now be described in further detail by using Examples and Comparative Examples. The present invention is not limited to the examples described below.

Example 1

[Hydrothermal Synthesis Step]

Into a 500 mL glass inner cylinder of an autoclave, 18.38 g (0.10 mol) of $V_2O_5$ (produced by Nacalai Tesque, 99% purity), 200 g of distilled water (produced by Nacalai. Tesque, for HPLC), and 23.06 g (0.20 mol) of $H_3PO_4$ (produced by Nacalai. Tesque, 85% purity) were added in this order and stirred with a magnetic stirrer. Then 2.55 g (0.05 mol) of hydrazine monohydrate was added as a reductant. The pH was 3. The glass inner cylinder was hermetically sealed and was retained at 95° C. for 16 hours in the autoclave under stirring. The content was cooled to room temperature and the glass inner cylinder was opened. A light blue paste with no flowability was obtained. The pH of the liquid was 3.

To the resulting paste-like substance, 8.48 g (0.20 mol) of $LiOH \cdot H_2O$ (produced by Nacalai Tesque, 99% purity) was added. $LiOH \cdot H_2O$ remained on the paste and no changes in color hue were observed. The pH immediately after addition was 11.

Figure 3:
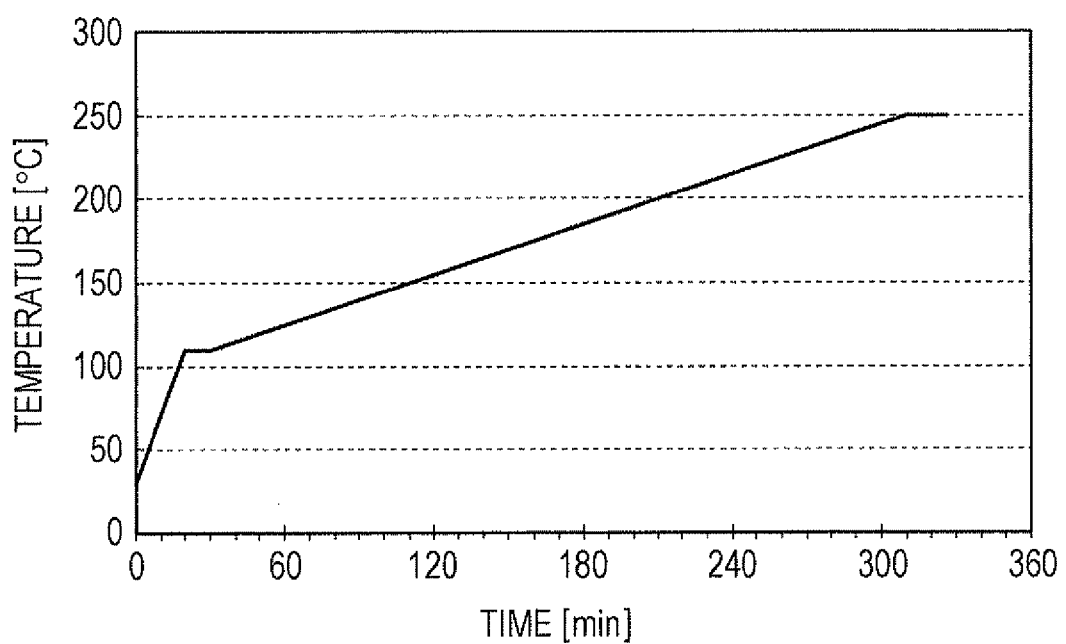
FIG. 3 is a chart showing a temperature elevation profile in Example 1.

The glass inner cylinder was hermetically sealed and the temperature was increased from the initial temperature (25° C.) to 110° C. at a rate of 4° C./min while stirring and then at 0.5° C./min from 110° C. to 250° C. The temperature profile is shown in FIG. 3. After reaching 250° C., a temperature of 250° C. was maintained for 10 hours.

After the heater was turned off, cooling was conducted until the temperature inside the container was decreased to room temperature. As a result, a suspension containing brown precipitates was obtained. The pH of this substance was measured and was 7. After removing the supernatant, about 200 mL of distilled water was added and the precipitates in the container were washed while being stirred (pH 7). Then suction filtration was conducted (washing with water). About 700 mL of acetone was added to wash the precipitates in the same manner as washing with water. The substance after filtration was dried to obtain 31.78 g of a brown solid. The yield was 94.1% (97% including 0.97 g of coarse particles) on a $LiVOPO_4$ basis.

[Firing Step]

Into an alumina crucible, 3.00 g of the substance washed with acetone was placed and heated from room temperature to 450° C. for 45 minutes in an ambient atmosphere and heat-treated at 450° C. for 4 hours to obtain 2.96 g of powder.

Examples 2, 3, 4, 5, and 6

The same process was conducted as in Example 1 except that the heating rates used from 110° C. to 250° C. were changed to 0.1, 0.2, 0.3, 0.8, and 2.2° C./min.

Examples 7 and 8

The same process was conducted as in Example 1 except that the heating rates used from 25° C. to 110° C. were changed to 3 and 10° C./min.

Examples 9 and 10

The same process was conducted as in Example 1 except that the amounts of hydrazine charged were 15/25 fold and 35/25 fold that used in Example 1, and the reductant concentrations used were changed to 0.15 mol/L and 0.35 mol/L.

Examples 11 and 12

The same process was conducted as in Example 1 except that citric acid and ascorbic acid were added instead of hydrazine as a reductant in a molar amount equal to that of hydrazine.

Example 13

The same process was conducted as in Example 1 except that the heating rate from 25° C. to 110° C. was 0.5° C./min.

Comparative Example 1

The same process was conducted as in Example 1 except that the heating rate from 110° C. to 250° C. was 3° C./min.

Comparative Example 2

The same process was conducted as in Example 1 except that the heating rate from 25° C. to 110° C. was 12° C./min.

Comparative Example 3

The same process was conducted as in Example 1 except that the heating rate from 25° C. to 110° C. was 0.4° C./min.

Comparative Example 4

The same process was conducted as in Example 1 except that the heating rate from 110° C. to 250° C. was 0.05° C./min.

(Evaluation)

[Confirmation of Crystal Structure]

The active materials of the respective examples were analyzed by X-ray diffractometry. Among a plurality of peaks, peaks having a relatively high intensity were observed at 2θ=26.966°, 27.582°, and 28.309°. It was thus confirmed that the active materials were mainly composed of β-type crystals of $LiVOPO_4$.

[Observation Of Shape of Active Material]

The shapes of the active materials of Examples and Comparative Examples were observed with a scanning electron microscope. An electron microscope image of the active material of Example 1 is shown in FIG. 1. The active materials of Examples were each a mixture of rodlike particles 10 and spherical particles 20. The average long-axis length of the rodlike particles and the average diameter of the spherical particles were measured using the SEM image for each Example. In Comparative Examples, irregularly shaped particles were obtained.

[Measurement of Discharge Capacity]

A slurry was prepared by dispersing a mixture of an active material of corresponding Example or Comparative Example, polyvinylidene fluoride (PVDF) serving as a binder, and acetylene black serving as a conductive material in N-methyl-2-pyrrolidone (NMP) serving as a solvent. The slurry was prepared so that the weight ratio of the active material, acetylene black, and PVDF in the slurry was 84:8:8. The slurry was applied to an aluminum foil serving as a collector, dried, and rolled to obtain an electrode (positive electrode) including an active material layer containing the active material.

The resulting electrode and a counter electrode, which was a Li foil, were stacked on top of one another with a separator formed of a polyethylene microporous film therebetween to obtain a multilayered unit (element body). The multilayered unit was placed in an aluminum laminate pack. A 1 M $LiPF_6$ solution serving as an electrolyte solution was poured into the aluminum laminate pack, and the aluminum laminate pack was vacuum-sealed. As a result, evaluation sample cells of Examples and Comparative Examples were obtained.

The discharge capacity (unit: mAh/g) of each evaluation sample cell was measured at 25° C. and a 1 C discharge rate (current value at which discharge ends in 1 hour when constant-current discharge is conducted). The results are shown in Table 1.

TABLE 1

| | Type of reductant | Reductant concentration (mol/L) | Temperature elevation rate T1 (25° C. → 110° C.) (° C./min) | Temperature elevation rate T2 (110° C. → 250° C.) (° C./min) | Particle shape | Average diameter of spherical particles (μm) | Average long-axis length of rodlike particles (μm) | Discharge capacity (mAhg$^{-1}$) at 1C, 25° C. |
|---|---|---|---|---|---|---|---|---|
| Ex. 1 | Hydrazine | 0.25 | 4 | 0.5 | Spherical + rodlike | 0.45 | 0.31 | 120 |
| Ex. 2 | Hydrazine | 0.25 | 4 | 0.1 | Spherical + rodlike | 0.49 | 0.35 | 120 |
| Ex. 3 | Hydrazine | 0.25 | 4 | 0.2 | Spherical + rodlike | 0.48 | 0.36 | 122 |
| Ex. 4 | Hydrazine | 0.25 | 4 | 0.3 | Spherical + rodlike | 0.41 | 0.3 | 121 |
| Ex. 5 | Hydrazine | 0.25 | 4 | 0.8 | Spherical + rodlike | 0.57 | 0.5 | 115 |
| Ex. 6 | Hydrazine | 0.25 | 4 | 2.2 | Spherical + rodlike | 0.98 | 0.85 | 103 |
| Ex. 7 | Hydrazine | 0.25 | 3 | 0.5 | Spherical + rodlike | 0.5 | 0.4 | 117 |
| Ex. 8 | Hydrazine | 0.25 | 10 | 0.5 | Spherical + rodlike | 0.78 | 0.61 | 109 |
| Ex. 9 | Hydrazine | 0.15 | 4 | 0.5 | Spherical + rodlike | 0.41 | 0.32 | 103 |
| Ex. 10 | Hydrazine | 0.35 | 4 | 0.5 | Spherical + rodlike | 0.59 | 0.47 | 103 |
| Ex. 11 | Citric acid | 0.25 | 4 | 0.5 | Spherical + rodlike | 0.73 | 0.57 | 112 |
| Ex. 12 | Ascorbic acid | 0.25 | 4 | 0.5 | Spherical + rodlike | 0.38 | 0.31 | 118 |
| Ex. 13 | Hydrazine | 0.25 | 0.8 | 0.5 | Spherical + rodlike | 0.86 | 0.75 | 101 |
| CE 1 | Hydrazine | 0.25 | 4 | 3 | Irregular | 2.5 | | 70 |
| CE 2 | Hydrazine | 0.25 | 12 | 0.5 | Irregular | 1.2 | | 89 |
| CE 3 | Hydrazine | 0.25 | 0.4 | 0.5 | Irregular | 1.5 | 1.7 | 76 |
| CE 4 | Hydrazine | 0.25 | 4 | 0.05 | Irregular | 1.05 | 1.3 | 92 |

Ex.: Example
CE: Comparative Example

REFERENCE SIGNS LIST 30 active material
10 positive electrode (electrode)
12 collector
14 active material layer
100 lithium ion secondary battery

The invention claimed is:

1. An active material comprising particles that have an aspect ratio of 1 to 0.7 and an average particle diameter of 0.4 to 1 μm and that are mainly composed of β-type crystals of LiVOPO$_4$ and particles that have an aspect ratio of 0.3 or less and an average long-axis length of 0.2 to 0.9 μm and that are mainly composed of β-type crystals of LiVOPO$_4$.

2. An electrode comprising a collector and an active material layer that contains the active material according to claim 1 and is disposed on the collector.

3. A lithium ion secondary battery comprising the electrode according to claim 2.

* * * * *